UNITED STATES PATENT OFFICE.

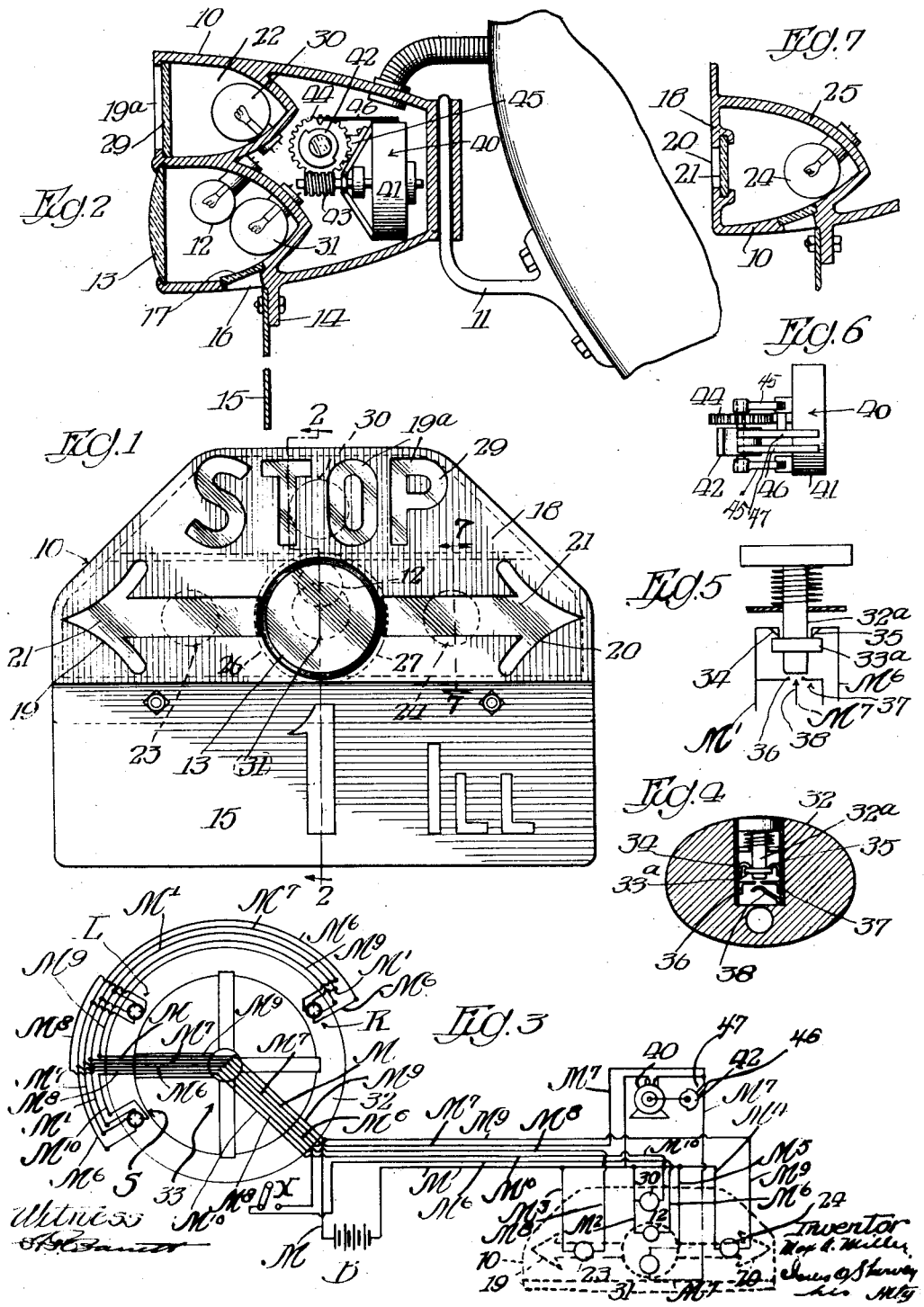

MAX A. MILLER, OF MAYWOOD, ILLINOIS.

SIGNAL APPARATUS FOR MOTOR-VEHICLES.

1,210,966.　　　　　Specification of Letters Patent.　　　Patented Jan. 2, 1917.

Application filed March 31, 1916.　Serial No. 87,893.

*To all whom it may concern:*

Be it known that I, MAX A. MILLER, a citizen of the United States, and a resident of Maywood, county of Cook, and State of Illinois, have invented certain new and useful Improvements in Signal Apparatus for Motor-Vehicles, of which the following is declared to be a full, clear, and exact description.

This invention relates to signal apparatus for motor vehicles, and its primary object is to provide a rear signal of improved construction, operable from the driver's seat, and capable of being manipulated so as to indicate to the drivers of following vehicles the direction which the driver intends to turn his car, and also that he intends to stop the car.

Another object is to provide a rear signal for motor vehicles, with a flashing light, operable from the driver's position and arranged in connection with direction indicators, to attract the attention of following drivers.

Another object is to provide direction pointers, together with a flashing light, combined in such a manner that the effect upon the eye of following drivers is to forcibly direct them or inform them as to which direction the driver intends to turn the car.

With these and other objects and advantages in view, this invention consists in the several novel features fully set forth in the following specification and more definitely pointed out in the appended claims.

The invention is clearly illustrated in the accompanying drawing, in which:—

Figure 1, is a face view of a lamp housing forming part of the present invention; Fig. 2, is a vertical section taken on line 2—2 of Fig. 1; Fig. 3, is a diagrammatic view of the electric circuits for controlling the signaling apparatus; Fig. 4, is a detail cross section through the steering wheel rim of a motor vehicle, and showing a certain push button therein; Fig. 5, is a diagrammatic view of the electric circuit connections in said push button; Fig. 6, is a plan of certain circuit interrupting disk and brushes, and Fig. 7, is a detail vertical section taken on line 7—7 of Fig. 1.

Referring to said drawing, which illustrates a simple embodiment of the present invention, 10, designates a housing which may be supported on some accessible part of the rear of the vehicle by a bracket 11. Said housing may contain a tail light lamp 12, as usual, a tail light lens 13, preferably red in color, and a license holding lug or flange 14, to which may be bolted or otherwise secured the license plate 15. A slot 16, in the bottom of the housing 10, covered by a transparent or glass plate 17, permits the rays of light from the lamp 12, to illuminate the license plate 15, whereby the numbers thereon may be made visible in the dark.

The wall 18, of the housing is formed with two openings 19, 20, which are here shown in the form of arrows, pointing "right" and "left"; the stems of said arrows terminate at the lens 13, or very close thereto, so as to make it appear that the lens and arrows are connected, the purpose of which will appear later. Behind and closing each slot or opening 19, 20, is secured a glass plate 21, (preferably red in color) and behind the glass plates 21, are secured an electric lamp 23, 24, each lamp being secured in a socket fastened to a wall 25, of the housing 10, in any desired manner. The lamps 12, 23, 24 are partitioned away from each other by partitions 26, 27, so that the light rays from the lamp 12, will be confined to the tail light lens, whereas the light rays from the lamps 23, 24 will be confined to the arrows or direction indicators.

If desired the housing may have a chamber 22, above the ones containing the lamps 12, 23, 24, the wall 18, of which may be formed with openings 19$^a$ representing letters forming a sign as for instance the word "stop", and a glass plate 29, may be secured to the wall 18, directly back of said openings. An electric lamp 30, is secured in a socket supported back of the sign and said socket is secured in a wall of the housing in any desired manner. Behind the tail light lamp 12, is a second or flashing tail light lamp 31, which is secured in a socket fastened to the housing in any suitable manner. It is to be understood that during daylight under normal driving conditions none of the lamps in the housing is lighted, whereas after dark the tail light lamp 12, is lighted as usual.

The signal may be operated at some readily accessible portion of the vehicle adjacent the driver's seat, but I have discovered that the most convenient place for locating the controlling means is directly on the steering wheel of the vehicle, it being borne in mind that the driver's hands hold the steering wheel, particularly in stopping or turning the car from its direction of movement. For this reason, I have embedded push buttons, R, L, S, in the rim 32, of the steering wheel 33, which buttons are flush with the rim, but which may be easily operated by the hand or hands holding the wheel. For operating the lighting system which I have illustrated, each push button has a spring pressed, depressible stem $32^a$, formed with a metal flange $33^a$, which under normal conditions contacts with two contact pieces 34, 35, forming terminals of the tail light circuit; the lower end of the push button stem engages and makes contact between three contact pieces 36, 37, 38, that form terminals of the circuits, as will appear later, it being understood that in the operation of the signal, the depression of a push button closes a circuit through one of the lamps behind one of the arrows or behind the "stop" signal, and closes a circuit through the secondary tail light lamp 31, and through an interrupter, whereby a series of flashes are produced in the secondary tail light lamp 31.

With the use of a light which flashes a signal, attention thereto is immediately attracted so that a following driver's attention is called, although he may be looking elsewhere than immediately in front of him. To produce a series of flashes during the intervals that any of the signal lamps are lighted, (except, of course, the main tail light lamp), I employ an interrupter 40, for interrupting the flashing lamp circuit, which interrupter is set in motion whenever a push button is depressed.

For convenience, the interrupter is here shown as comprising a small electric motor 41, which may be supported in the lamp housing if desired, and said motor drives a circuit making and breaking disk 42. To reduce the speed of the disk 42, I employ speed reducing gearing between the motor and disk, the same being here illustrated as comprising a worm pinion 43, fast on the motor shaft and a worm gear wheel 44, fast on the disk shaft and meshing with said worm pinion. The disk shaft is journaled in brackets 45, conveniently supported from the motor frame, and the disk has one or more mutilated or cut out portions in its periphery to leave gaps therebetween. Contact brushes 46, 47, bear upon said disk and close the lamp circuit to the flasher lamp 31, but during each rotation of the disk, the gap or gaps in the periphery of the disk travel past the contact brushes, thereby breaking the circuit momentarily until the solid portion of the disk again comes in contact with the brushes. It will therefore be understood that whenever a push button is depressed, the motor is started, the disk rotated and the circuit through the flashing lamp interrupted whereas the circuit through the lamp behind an indicator is kept closed.

I will now describe the several circuits which comprise a simple system for operating the signal from the driver's seat, and for convenience have shown a battery B, as the source of electric supply although it is to be observed that the generator of a motor vehicle may be employed in its place as is customary for supplying the current to the lamps.

From the contact pieces 34, 36, of each push button runs a branch wire $M^1$ to the main battery wire M, which runs to the battery B, and thence by way of branches $M^2$, $M^5$, to the main tail light lamp 12, and secondary or flashing tail light lamp 31; branches $M^3$, $M^4$, to the direction indicating lamps 23, 24, and branch $M^2$, to the lamp 30, behind the sign "stop". The remainder of the tail light lamp circuit may be traced from the lamp 12, through wire $M^6$, night switch X, wire $M^6$, and branches to the contact pieces 35, of each push button. During daylight, the switch X is opened, but at night time it is closed to illuminate the tail light lamp 12; when, however, the signal is operated, and any push button is depressed, the flange $33^a$, is moved out of contact with the contact pieces 34, 35, of the tail light lamp circuit, and that lamp extinguished so long as the push button is depressed.

The remainder of the flashing tail light lamp 31 circuit may be traced from the lamp through wire $M^7$, interrupter disk 42, wire $M^7$, to the contact piece 38, of each push button and thence back through the branches $M^1$, and main wire M. The interrupter motor circuit may be traced from the battery wire $M^1$, through the motor and back through wire $M^7$, to the button. The circuit through the lamp 23, which lights the arrow pointing toward the "left" may be traced from the lamp 23, through wire $M^8$, to the contact piece 37, of the button L, and back to battery through contact piece 36, and wires $M^1$, M. The circuit from "right" indicating lamp 24, may be traced through wire $M^9$, to contact piece 37, of button R, thence through contact piece 36, of said button back to battery through wires $M^1$, M. The circuit of the sign illuminating lamp 30, may be traced from said lamp 30, through wire $M^{10}$, to the contact piece 37, of button S, thence through contact piece 36, of said button and back through wires $M^1$, M.

From the above it will be understood that whenever any one of the push buttons is depressed, the tail light lamp circuit is broken (assuming it has been closed by the switch X) and a circuit is closed through the interrupter motor and through the direction indicating lamp in circuit with said button, through the interrupter disk brushes, and through the secondary or flashing lamp, whereby a following driver's attention is instantly directed to the signal and the direction of movement or stoppage is indicated to him. As soon as the driver takes his finger off the push button the circuit through the tail light lamp is again closed and the other circuits opened.

The operation of the device is fully set forth in the above description, and needs no further explanation. More or less variation of the exact details of construction are possible without departing from the spirit of this invention; I desire, therefore, not to limit myself to the exact form of the invention set forth, but intend in the following claims to point out all of the invention disclosed herein.

I claim as new and desire to secure by Letters Patent,

1. In a signal apparatus for motor vehicles, a signal flashing lamp, and a direction indicating lamp, normally open electric circuits therefor, including a circuit making and breaking device for both circuits located adjacent the driver's seat of a motor vehicle, an electrically operated circuit interrupter having circuit interrupting means interposed in one of said circuits, whereby a series of flashes are produced in one of said lamps when the circuit thereof is closed, and a normally open circuit for said interrupter capable of being closed by said circuit making and breaking device, of the direction indicating lamp.

2. In a signal apparatus for motor vehicles, a signal flashing lamp, "right" and "left" indicating lamps, normally open electric circuits therefor, circuit making and breaking devices for said circuits located adjacent the driver's seat of the motor vehicle, an electrically operated circuit interrupter having circuit interrupting means interposed in the signal lamp circuit, and arranged to produce a series of flashes in said lamp, and a separate normally open circuit for said interrupter capable of being closed by either of said "right" and "left" lamp circuit making and breaking devices.

3. In a signal apparatus for motor vehicles, a tail light lamp, a circuit therefor, including a night switch whereby said circuit may be opened and closed, a signal flashing lamp, and "right" and "left" indicating lamps normally open circuits therefor, an electrically operated circuit interrupter having circuit interrupting means interposed in said signal lamp circuit, and adapted to produce a series of flashes therein, a separate circuit for said interrupter, and "right" and "left" circuit closing devices for making and breaking the circuits through the tail light circuit, the "right" and "left" indicating lamps, the "signal" lamp, and interrupter.

4. In a signal apparatus for motor vehicles, a rear lamp housing having a centrally located lens and horizontally disposed transparent direction indicating portions contiguous therewith, electric lamps behind said lens and other transparent portions, electric circuits therefor, a circuit making and breaking device for each circuit, an electrically operated circuit interrupter, having circuit interrupting means interposed in the circuit of the lamp which is located behind the lens, and an electric circuit for said interrupter controlled by each circuit making and breaking device, whereby a series of flashes are produced in one of said lamps while the other is burning steadily.

5. In a signal apparatus for motor vehicles, a signal lamp, and a plurality of direction indicating lamps, electric circuits for said lamps, an electrically operated circuit interrupter having circuit interrupting means interposed in the signal lamp circuit, and push buttons, one in the circuit of each direction indicating lamp, each push button also being in the circuit of the signal flashing lamp.

MAX A. MILLER.